United States Patent [19]

Hekal

[11] 4,374,714
[45] Feb. 22, 1983

[54] PROCESS FOR THE PRESERVATION OF COLOR AND FLAVOR IN LIQUID CONTAINING COMESTIBLES

[75] Inventor: Ihab M. Hekal, Stamford, Conn.

[73] Assignee: Continental Packaging Company, Inc., Stamford, Conn.

[21] Appl. No.: 357,969

[22] Filed: Mar. 15, 1982

[51] Int. Cl.³ .......................... C25B 3/04; A23L 1/00; A23L 3/32

[52] U.S. Cl. .................................. 204/131; 204/129; 204/130; 426/237; 426/239; 426/244; 55/2

[58] Field of Search .................... 204/131, 129, 130; 426/237, 239, 244; 55/2

[56] References Cited

U.S. PATENT DOCUMENTS 2,176,343 10/1939 Howard .............................. 204/131
2,848,400 8/1958 Meier et al. ........................ 204/131

Primary Examiner—R. L. Andrews
Attorney, Agent, or Firm—Paul Shapiro

[57] ABSTRACT

The susceptibility to color and flavor loss of liquid containing comestibles due to oxidative deterioration during storage is reduced by placing the comestible in the cathode compartment of an electrochemical cell in which the compartments of the cell containing the anode and cathode are separated by a cation permeable membrane and the anode compartment contains a highly dissociatable, non-oxidizable inorganic acid electrolyte, and thereafter subjecting the comestible to a high density current for a short period of time sufficient to generate hydrogen at the cathode to remove oxygen from the comestible but insufficient to effect a substantial chemical change in the comestible. The deoxidized comestible is then stored in a hermetically sealed container in which air is substantially absent.

11 Claims, 1 Drawing Figure

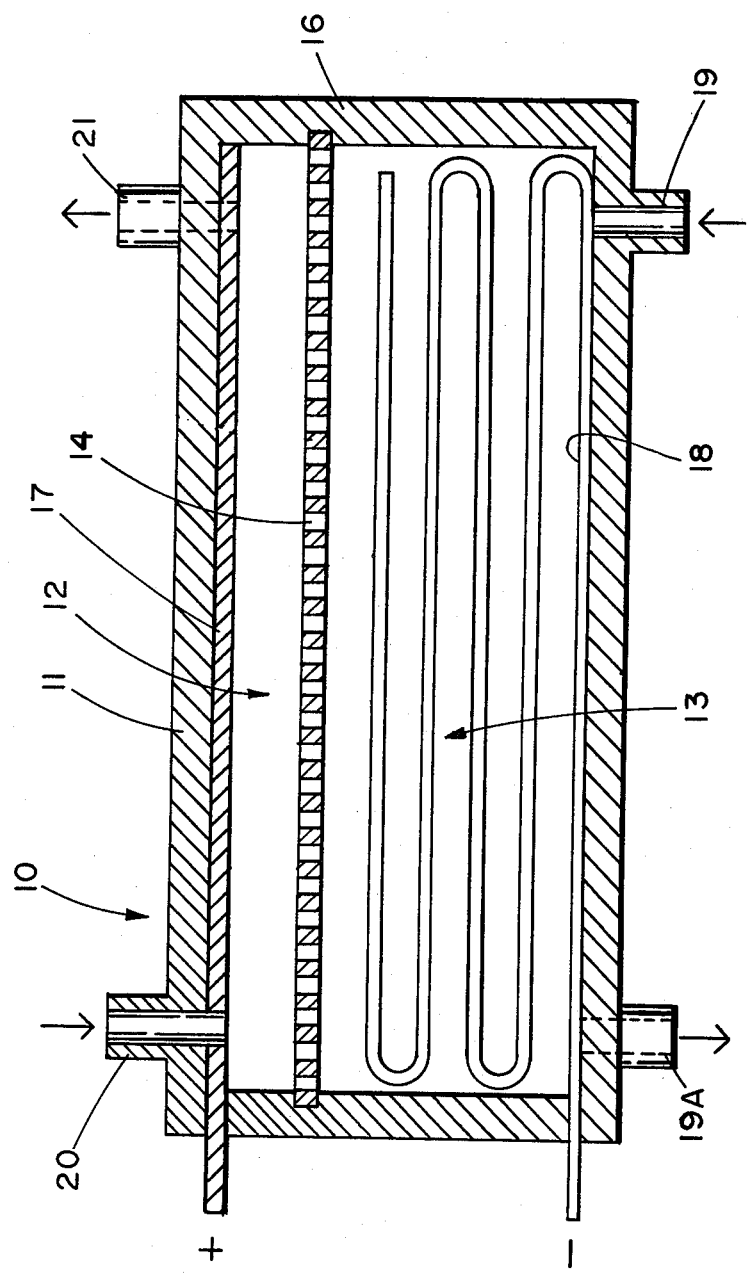

4,374,714

PROCESS FOR THE PRESERVATION OF COLOR AND FLAVOR IN LIQUID CONTAINING COMESTIBLES

BACKGROUND OF THE INVENTION

1. Field of the Invention

This invention relates to a process for imparting color and flavor stability to liquid containing comestibles and more particularly to the achievement of such stabilization by means of electrolytic deoxidation of the comestible.

2. The Prior Art

It is well known that comestibles and particularly fruit juices are unstable in that undesirable changes in appearance and flavor due to oxidative deterioration occur when such juices are packaged and permitted to stand for even short periods of time, e.g. a day or two.

Among the oxidative changes which comestibles such as fruit juices are liable to undergo are the loss of the "fresh" flavor taste and/or the development of changes in color, i.e., a general browning of the juice after it is packaged or canned. These changes in the juice greatly decrease its attractiveness for consumer use. In order to produce saleable, satisfactory juices it is necessary that the taste of the fruit juice approximate a natural or "fresh" taste and that the off tastes which otherwise develop in packaged or canned juices be reduced to a minimum. Secondly, it is necessary that the fruit juices have a desired natural color which will not rapidly darken or brown on standing.

The present invention relates to a process of taste and color stabilization of liquid comestibles such as fruit juices whereby the desirable properties of the comestible are retained for long periods of time and undesirable changes therein are inhibited or retarded by the electrolytic deoxidative treatment of the comestible in accordance with the specific steps of the present invention which will hereinafter be disclosed.

Electrolytic treatment of fruit juices is known to the prior art. For example, U.S. Pat. No. 1,883,420 teaches a method of color stabilization of fruit juices wherein inert gases such as carbon dioxide are bubbled through the juice under high vacuum to remove oxygen while an electrical current is passed through the juice. As will hereinafter be illustrated electrolytic treatment of the type disclosed in U.S. Pat. No. 1,883,420 does not have any substantial effect on the deoxidation of the juice.

U.S. Pat. No. 3,709,802 teaches decolorization of melanodins in food wherein the product is placed in the cathode zone of an electrolytic cell separated into anode and cathode zones by an ion permeable membrane such as a ceramic tube or disc the anode zone containing an electrolyte such as potassium chloride, sodium chloride and the liquid food product being subjected to a low amperage current for an extended period of time, e.g. 16-38 hours to effect electrolytic reduction of the melanodins. The conditions proposed in U.S. Pat. No. 3,709,802 for the decolorization of melanodins will change the taste and flavor of the food product, add undesirable cations such as potassium and sodium to the liquid food product and will not effect substantial deoxidation of the liquid food product. Further the time required in the practice of U.S. Pat. No. 3,709,802 is impractical for the treatment of large tonnages of liquid comestibles required in commercial operations.

SUMMARY OF THE INVENTION

The practice of the present invention minimizes oxidative deterioration of liquid containing comestibles and particularly flavor characteristics and inhibits the browning reaction normally associated with the packaging and storage of fruit juices.

In accordance with the present invention the liquid containing comestible is placed in the cathode compartment of an electro-chemical cell in which the anode and cathode compartments are separated by a cation permeable membrane and the anode compartment contains a solution of a highly dissociatable, non-oxidizable inorganic acid such as sulfuric acid, phosphoric acid, perchloric acid and fluosilicic acid. The liquid containing comestible is subjected to a high density current for a short period of time to generate hydrogen at the cathode whereby deoxidation of the comestible is effected without effecting any essential chemical change in the comestible.

It is believed that the electrolytic treatment of the liquid containing comestible in accordance with the practice of the present invention causes $H^{30}$ ion to be passed from the anode compartment to the cathode compartment of the electrolytic cell wherein it is converted to $H_2$ gas and reacts with any dissolved and/or chemisorbed oxygen present in the comestible to form water and thereby effect the removal of the oxygen from the comestible contained in the cathode compartment.

By the removal of dissolved and chemisorbed oxygen, color and flavor deterioration of the comestible is minimized.

DETAILED DESCRIPTION OF THE INVENTION

The term "liquid containing comestible" includes within its meaning foodstuffs which are perishable, that is, which are subject to deleterious change by the action of dissolved or chemisorbed oxygen and which contain substantial moisture. The food product may range in consistency from thin liquids to semi-solids which can be pumped or otherwise circulated through the cathode compartment of an electrolytic cell. Examples of such food products are fruit and vegetable juices including juice concentrates and juice pulps, beer, wine and other manufactured beverages like "soft" drinks, soups, stews, food pastes, milk, whole milk, homogenized milk, skimmed milk, concentrated milk and the like milk products.

The FIGURE is a diagrammatic view of a cross-section of an electrolytic cell used for effecting deoxidation of liquid containing comestibles, such as fruit juice, affording flavor and color stabilization.

Referring to the FIGURE, an electrolytic cell 10 suitable for effecting the deoxidation of a liquid containing comestible such as fruit juice is comprised of a container 11 which is divided into anode compartment 12 and cathode compartment 13 by a cation permeable membrane 14 extending the length of the container 11 and supported in the wall 16 of the container. The cation permeable membrane 14 may be of various suitable types, such, for example, as the type available commercially under the trademark "Nafion" from the E. I. Dupont De Nemours & Company. Nafion membranes are prepared by reacting $SO_2$ with tetrafluoroethylene to form a cyclic sulfone which in turn is reacted with hexafluoropropylene epoxide to give sulfonyl fluoride adducts which are reacted with sodium carbonate to yield a sulfonyl fluoride vinyl ether. The vinyl ether product is polymerized with tetrafluoroethylene to give a perfluorocarbon sulfonyl fluoride copolymer from which the Nafion membrane is fabricated. Nafion membranes are available in thicknesses of 3.5–10 mils.

Defining one wall of the anode compartment 12 is anode 17. Cathode 18 defines a wall of cathode compartment 13 and optionally may extend therefrom throughout the cathode compartment in the form of a coil or other sinuous design to maximize the interfacial contact of the cathode 18 with the liquid containing comestible to be deoxidized. The electrodes 17, 18 are embedded within the walls of the container 11 which are formed of a non-toxic synthetic resin. The electrodes themselves are suitably made of non-toxic, electrically conductive material, the anode usually being a noble metal, for example platinium, platinum plated titanium, columbium, ruthenium and ruthenium plated titanium and the cathode being usually stainless steel. The electrodes are connected by electrically conductive wiring (not shown) to a direct current source (not shown).

As will be seen from the FIGURE, the liquid containing comestible to be deoxidized is introduced into the cathode compartment 13 of the container 11 by way of an inlet 19 at the bottom of the container 11. In the line to the inlet 19 there normally is a proportioning means such as a valve or pump, not shown, for controlling the flow rate of the liquid containing comestible. The liquid containing comestible entering the cathode compartment 13 is deoxidized by the passage of a high current density through the cell as the liquid food product is circulated through the cathode compartment 13 in contact with the cathode 18.

To effect the rapid deoxidation which is critical to the practice of the present invention, the current density imposed on the liquid containing comestible as it is passed through the cathode compartment 13 is generally in the range of about 0.002 to about 10 amperes per square inch (amps/in$^2$) and preferably in the range of about 0.01 to about 2.0 amps/in$^2$. At these current densities, voltages in the order of about 10 to about 20 volts are employed.

The total residence time of the liquid containing comestible in the cathode compartment 13 is between about 0.01 and about 100 seconds and preferably about 0.5 and about 60 seconds. The electrical charge delivered to the comestible in the cathode compartment 13 at these residence times and current densities is generally in the range of about 100 to about 100,000 coulombs per liter (Q/l) of liquid containing comestible and preferably about 500 to about 10,000 Q/l.

In carrying out the process of the present invention using the apparatus shown in the FIGURE, when a direct current of suitable voltage is applied across the electrodes 17, 18, H$^{30}$ ions migrate through the membrane 14 into cathode compartment 13 and are converted to hydrogen gas at the cathode in accordance with the formula

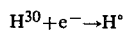

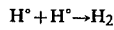

At the anode the reaction is:

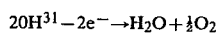

After the short-time exposure to the high current density in the cathode compartment 13, the deoxidized liquid containing comestible is discharged from the cathode compartment 13 through outlet 19A. An anolyte comprised of a solution of a strong, non-oxidizable mineral acid electrolyte such as sulfuric or phosphoric acid at a concentration of about 1 to about 98% by weight and preferably about 5 to about 25% by weight enters the anode compartment 12 through inlet 20 at the top of the container 11 and is discharged from the compartment 12 by way of outlet 21 also at the top of the container 11. In the line to inlet 20 there normally are proportioning means such as valves or pumps, not shown, for controlling the flow rate of the acid solution relative to that of the liquid containing comestible.

The use of a cation permeable membrane is a critical feature of the present invention. By the use of a cation permeable membrane, the membrane 14 is permeable to H$^{30}$ cations but impermeable to sulphate or phosphate anions. The H$^+$ ions are permitted to pass from the anode chamber 12 to the cathode chamber 13 and be converted to hydrogen gas at the cathode which then combines with oxygen suspended in the comestible to form water, to accomplish deoxidation of the comestible. The small quantity of water produced is not sufficient to have any noticeable effect on the flavor or other properties of the comestible. Hydroxyl ions in the anode compartment are oxidized to form water and oxygen. By the use of a cation permeable membrane, anions from the cathode compartment are retained therein thereby preventing the loss of acid or other essential components from the liquid containing comestible undergoing deoxidation while simultaneously preventing the migration of anions from the anode compartment into the cathode compartment which would result in contamination of the liquid containing comestible being deoxidized.

In addition to the short term, high current density deoxidation it is also a critical feature of the present invention that the electrolyte be a highly ionizable, nonoxidizable acid such as sulfuric acid or phosphoric acid, as H$^+$ ion must be present to generate the hydrogen gas at the cathode to effect deoxidation of the liquid containing comestible. A highly ionizable anolyte is required in the practice of the present invention in order that the anolyte in the anode compartment have a high order of electrical conductivity to permit the rapid passage of the high reducing current density required for the deoxidation process to be operative and practical. No cation except hydrogen ion should be present in the anode compartment as such cations will pass through the cation permeable membrane and contaminate the liquid containing comestible. Thus if an electrolyte such as NaOH is used, the Na cation will pass through the cation permeable membrane and contaminate the comestible in the cathode compartment 13. Organic acids such as acetic and citric acid are undesirable as electrolytes as these acids will be oxidized at the anode by the high current densities being passed through the electrolytic cell.

The anolyte is circulated at the proper electrolyte concentration through the anode chamber through inlet 20 and outlet 21. Oxygen that is formed is vented to the air. Distilled water is periodically added to the anolyte to replace the water that has been electrolyzed.

The deoxidized liquid containing comestible discharged from the cathode compartment may be fed directly into cans, bottles and other containers and these containers are then sealed and stored. To preserve the deoxidized state of the liquid comestible, air is removed from the container headspace prior to being filled with the deoxidized product by vacuum or is otherwise replaced with an inert gas, as for example nitrogen, which is insoluble in the liquid containing comestible, prior to sealing the container. Alternatively, the headspace is eliminated entirely by filling the container completely with the deoxidized liquid comestible. As a further alternative in packaging the deoxidized liquid containing comestible, the comestible is fed to containers under an inert gas atmosphere and then automatically sealed in the containers in an inert gas atmosphere.

The deoxidation treatment of the present invention makes possible the storage of concentrated fruit juices at ambient temperature and the manufacture of improved concentrated or single strength juices for non-refrigerated shelf storage.

The following Examples further illustrate the invention:

EXAMPLE I

The electrolytic cell of the FIGURE was used to demonstrate the deoxidation of single strength orange juice.

The apparatus consisted of an anode compartment having a capacity of 0.7 liters and a cathode compartment having a capacity of 1.0 liters. The anode and cathode compartments were separated by a Nafion cation permeable membrane having a thickness of 15 mils and surface area of 50.75 square inches ($in^2$). The membrane was supported by a separator formed of polypropylene. The anode was formed from platinized titanium having a surface area of 50.75 $in^2$. The cathode was a stainless steel coil having a surface area of 162.2 $in^2$. Single strength orange juice was passed through the cathode compartment at the rate of 0.2 liters per minute (l/min.) at a temperature of 18° C. An anolyte containing 10% by weight phosphoric acid was circulated through the anode compartment at the rate of 0.2 l/min. at a temperature of 18° C. A D.C. current of 3.3 amps at potential of 5.8 volts was applied resulting in a current density of 0.02 amps/$in^2$ being passed through the cell. Under these conditions the orange juice was treated with 1000 Q/l of current.

The total time the orange juice was subjected to the electrical current in the cell was 3.5 minutes. Thereafter the juice was passed into glass containers under a nitrogen atmosphere and stored at 40° C. At weekly intervals the ascorbic acid content was analyzed and the color of the packaged juice observed. Ascorbic acid content is a measure of juice stability. The less the ascorbic acid content changes over a period of time, the more stable to deterioration is the juice. The results are recorded in Table I.

For purposes of contrast the procedure of Example I was repeated with the exception that solutions of sodium chloride and potassium chloride at 10% by weight concentration were substituted for phosphoric acid as the anolyte. The results of these contrasting runs are also recorded in Table I and are designated by the symbol "C". A voltage of 5.6 volts was required to pass 3.3 amps through the cell in which potassium chloride was the electrolyte and 6.2 volts was required to pass 3.3 amps through the cell in which NaCl was the electrolyte.

For purposes of further contrast, the procedure of Example I was repeated with the exception that an anion permeable membrane commercially available under the trademark Neosepta AF-4J having a thickness of 0.15 mm–0.20 mm was substituted for the cation permeable membrane used in Example I and 10% by weight sulfuric acid, potassium chloride and sodium chloride solutions were used as the anolyte. A voltage of 10.2 volts was required to pass 3.3 amps through the cell in which sulfuric acid was the electrolyte; 7.7 volts when potassium chloride was the electrolyte and 8.4 volts when sodium chloride was the electrolyte. The results of this series of contrasting runs are also recorded in Table I and are designated by the symbol "D".

For purposes of still further contrast, the procedure of Example I was repeated with the exception that a porous red clay membrane having a thickness of ⅜ inch was substituted for the cation permeable membrane used in Example I. A voltage of 22.1 volts was required to pass 3.3 amps through the cell when $H_2SO_4$ was the electrolyte and 14.3 volts when NaCl was the electrolyte. The results of this series of contrasting runs are also recorded in Table I and are designated by the Symbol "E".

For purposes of additional contrast, the procedure of Example I was repeated with the exception that no membrane separated the anode and cathode compartments, the juice being treated directly by the passage of the electrical current. The results of this run designated by the symbol "F" are also recorded in Table I.

For purposes of further additional contrast, the procedure of Example I was repeated with the exception that sodium chloride and potassium chloride were used as the anolyte or no membrane was used and the juice was packaged in glass bottles in which air had not been removed. The results of these runs designated by the symbol "G" are also recorded in Table I.

TABLE I

| Run No. | Membrane | Anolyte | Ascorbic Acid Concentration (ppm) Weeks at 40° C. | | | | Color Change After 12 Weeks |
|---|---|---|---|---|---|---|---|
| | | | 0 | 2 | 4 | 12 | |
| 1 | Cation | $H_3PO_4$ | 277 | 262 | 259 | 182 | None |
| $C_1$ | Cation | KCl | 243 | 215 | 213 | 126 | Lt. Brown |
| $C_2$ | Cation | NaCl | 246 | 230 | 204 | 132 | Lt. Brown |
| $D_1$ | Anion | $H_2SO_4$ | 276 | 254 | — | 163 | Lt. Brown |
| $D_2$ | Anion | KCl | 245 | 202 | — | 120 | Brown |
| $D_3$ | Anion | NaCl | 242 | 198 | — | 109 | Brown |
| $E_1$ | Clay | $H_2SO_4$ | 215 | 137 | — | 110 | Brown |
| $E_2$ | Clay | NaCl | 223 | 147 | — | 95 | Brown |
| F | — | — | 276 | 260 | 239 | — | Brown |
| $G_1$ | Cation | KCl | 243 | 54 | 35 | — | Dk. Brown |
| $G_2$ | Cation | NaCl | 246 | 32 | 28 | — | Dk. Brown |
| $G_3$ | — | — | 276 | 70 | 31 | — | Dk. Brown |

Lt. = Light,
Dk. = Dark

The data in Table I show that with the exception of the $H_3PO_4$/cation permeable membrane cell (Run No. 1) the color of the juice darkens appreciably after 12 weeks of storage whether or not packaged in a nitrogen atmosphere. When contrasted with the ascorbic acid concentration of the juice treated in the $H_3PO_4$/cation permeable membrane cell, the ascorbic acid concentration of the juice treated in the contrasting cells was substantially lower.

EXAMPLE II

The procedure of Example I was repeated with the exception that sulfuric acid was the anolyte and the measurement of ascorbic acid concentration was made immediately after the deoxidation treatment. The deoxidized juice was evaluated for taste by a panel consisting of 3 people. The results of this run are recorded in Table II below.

For purposes of contrast the procedure of Example II was repeated with the exception that either an anion permeable or clay membrane was substituted for the cation permeable membrane or sodium chloride or potassium chloride solution was substituted for sulfuric acid as the anolyte. The results of these contrasting runs, designated by the symbol "C" are recorded in Table II below.

For purposes of still further contrast, the procedure of Example II was repeated except the current delivery was raised to 5,000 or 10,000 Q/l, sodium chloride substituted for the sulfuric acid anolyte and an anion permeable or clay membrane substituted for the cation permeable membrane of Example II. The results of these contrasting runs designated by the symbol "D" (5,000 Q/l) or symbol "E" (10,000 Q/l) are recorded in Table II below:

TABLE II

| Run No. | Membrane | Anolyte | Ascorbic Acid conc. Before | Ascorbic Acid conc. After | pH B/A* | Acidity g/l citric acid Before | Acidity g/l citric acid After | Taste |
|---|---|---|---|---|---|---|---|---|
| 1 | Cation | $H_2SO_4$ | 241 | 236 | 3.18/3.18 | 12.92 | 12.94 | No change |
| $C_1$ | Anion | $H_2SO_4$ | 329 | 295 | 3.12/2.25 | 13.18 | 11.85 | Bland |
| $C_2$ | Clay | $H_2SO_4$ | 232 | 215 | 3.22/3.56 | 12.41 | 10.47 | Bland |
| $C_3$ | Cation | NaCl | 276 | 246 | 3.22/3.36 | 12.90 | 11.70 | Bland |
| $C_5$ | Anion | NaCl | 319 | 295 | 3.12/3.25 | 13.18 | 11.85 | Bland |
| $C_6$ | Clay | NaCl | 232 | 223 | 3.22/3.41 | 12.91 | 11.39 | Bland |
| $C_7$ | Cation | KCl | 276 | 243 | 3.21/3.36 | 12.81 | 11.71 | Bland |
| $C_8$ | Anion | KCl | 320 | 309 | 3.17/3.33 | 12.79 | 11.73 | Bland |
| $C_9$ | — | — | 319 | 285 | 3.12/3.16 | 13.18 | 12.77 | No change |
| $D_1$ | Anion | NaCl | 243 | 212 | 3.13/3.84 | 12.81 | 7.92 | V. bland |
| $D_2$ | Clay | NaCl | 232 | 195 | 3.22/4.56 | 12.91 | 5.79 | V. salty |
| $E_1$ | Anion | NaCl | 243 | 201 | 3.13/4.76 | 12.81 | 3.72 | V.V. bland |
| $E_2$ | Clay | NaCl | 232 | 175 | 3.22/5.50 | 12.91 | 3.01 | V. bland |

*Before/After,
V. = Very

The sodium and potassium levels of the orange juice in certain of the above runs were determined by chemical analysis prior to and immediately following the electrolytic treatment. The results of these analyses are summarized in Table IIA below. Untreated orange juice has a sodium level of 8.64 parts per million (ppm) and a potassium level of 1966 ppm.

TABLE IIA

| Run No. | Sodium ion conc. (ppm) | Potassium ion conc. (ppm) |
|---|---|---|
| 1 | 8.68 | 1970 |
| $C_4$ | 232 | 1969 |
| $C_7$ | 8.71 | 2174 |

By referring to Table II it is immediately apparent that the ascorbic and citric acid content of the orange juice drops significantly when electrolytic deoxidation of orange juice is attempted in the absence of an $H_2SO_4$ anolyte/cation permeable membrane combination being used in the electrolytic cell.

Similarly a rise in pH of the juice occurs when the $H_2SO_4$/cation permeable membrane combination is absent from this cell. A rise in the pH is undesirable because the taste is altered in a deleterious manner and the ascorbic acid is highly destabilized.

Note further there is a detrimental change in the taste of the juice product when the $H_2SO_4$/cation permeable membrane combination is absent from the cell or no membrane is used.

By reference to Table IIA, it is immediately apparent that the sodium and potassium ion concentrations of the juice do not change significantly when a $H_2SO_4$/cation permeable membrane cell is used (Run No. 1) whereas a significant rise in the sodium or potassium ion concentrations occur when a NaCl or KCl/cation membrane cell is used for deoxidation of the juice.

EXAMPLE III

The procedure of Example was repeated with the exception that 3000 Q/l at 0.02 amps/in$^2$ of electrical current was used to deoxidize single strength orange juice. Storage tests over varying lengths of time at 5° to 40° C. were performed. The juice was analyzed for dissolved oxygen and the color change noted. The results are summarized in Table III below.

For purposes of contrast the procedure of Example III was repeated with the exception that either the juice was not electrically treated (designated by the symbol "C") or air was present in the container headspace (designated by the symbol "D"). The results of the contrasting runs are summarized in Table III below.

TABLE III

| Run No. | Storage Temp. °C. | Color on Storage (Days) 126 | Color on Storage (Days) 147 | Color on Storage (Days) 210 | Dissolved $O_2$ in Juice (ppm) (Days) 126 | Dissolved $O_2$ in Juice (ppm) (Days) 147 |
|---|---|---|---|---|---|---|
| 1a | 5° | NC | NC | NC | 0.0 | 0.0 |
| 1b | 22° | NC | Lt.Brn. | Lt.Brn. | 0.0 | 0.0 |
| 1c | 40° | Lt.Brn. | Brn. | Dk.Brn. | 0.0 | 0.0 |
| $C_1$ | 5° | NC | Lt.Brn. | Lt.Brn. | 8.0 | 8.0 |
| $C_2$ | 22° | Brn. | Brn. | Dk.Brn. | 8.0 | 8.0 |
| $C_3$ | 40° | Brn. | Brn. | Dk.Brn. | 8.0 | 8.0 |
| $D_1$ | 5° | NC | Lt.Brn. | Lt.Brn. | 8.0 | 8.0 |
| $D_2$ | 22° | Dk.Brn. | Dk.Brn. | Dk.Brn. | 8.0 | 8.0 |
| $D_3$ | 40° | Dk.Brn | Dk.Brn. | Dk.Brn. | 8.0 | 8.0 |

NC = no change,
Lt. = Light,
Dk. = Dark
Brn = Brown

The data in Table III demonstrate the reduction in color change on storage obtained with juice treated in accordance with the electrolytic treatment of the present invention (Run nos. 1a–1c) when contrasted with the color change of juice which had not been electrolytically treated (Run nos. C$_1$–C$_3$ and D$_1$–D$_3$).

EXAMPLE IV

The procedure of Example III was repeated with the exception that concentrated orange juice was substituted for single strength orange juice and the current delivered to the cell was varied between 1200 and 3000 Q/l at 0.06 amps/in$^2$. The deoxidized juice was stored at 5° C. and the ascorbic acid concentration measured over a 147 day period, the initial ascorbic acid concentration being 1980 ppm.

TABLE IV

| Run No. | Current (Q/l) | Head-space Gas | Ascorbic Acid Conc. (ppm) After Storage (Days) | | | | Color Change (Days Storage) | |
|---|---|---|---|---|---|---|---|---|
| | | | 49 | 73 | 147 | 210 | 147 | 210 |
| 1 | 1200 | N$_2$ | 1902 | 1752 | 1725 | — | NC | — |
| 2 | 3000 | N$_2$ | 1921 | 1756 | 1720 | 1700 | NC | NC |
| 3 | 1200 | Air | 1815 | 1650 | 1619 | 1500 | NC | Brn. |
| 4 | 3000 | Air | 1874 | 1716 | 1584 | 1541 | NC | Lt.Brn. |
| C$_1$ | — | N$_2$ | 1911 | 1752 | 1688 | 1664 | Lt.Brn. | Lt.Brn. |
| C$_2$ | — | Air | 1838 | 1668 | 1520 | 1449 | Brn. | Brn. |

NC = no change,
Brn. = Brown,
Lt. = Light

The data in Table IV demonstrate that significant ascorbic acid loss and color change occur when untreated juice is stored at 5° C. in air or nitrogen (Runs C$_1$, C$_2$) when contrasted with juice that has been deoxidized in accordance with the practice of the present invention and stored under the same conditions.

EXAMPLE V

The procedure of Example I was repeated using apple juice and a level of current varying from 90–1641 Q/l. The absorbance of the juice was measured by visible light absorbance 500 mµ after the electrolytic treatment. The results of these runs are recorded in Table V below.

For purposes of contrast, the absorbance results disclosed in Examples 7 10 and 13 of U.S. Pat. No. 3,709,802 (designated by the symbol "Ex") are also recorded in Table V below.

TABLE V

| Run No. | Current Conditions | Current Level Q/l | Juice Circulation Rate in Cell (ml/min.) | Juice Residence time in cell | Effect Electrical Treatment Absorbance Before | After | Absorbance Change |
|---|---|---|---|---|---|---|---|
| 1 | 12V 10A | 90 | 6670 | 6.3 sec | 0.599 | 0.585 | −0.014 |
| 2 | 12V 10A | 720 | 833 | 50.6 sec | 0.671 | 0.578 | −0.093 |
| 3 | 20V 20A | 1641 | 731 | 57.5 sec | 0.658 | 0.600 | −0.058 |
| Ex10 | 20V 50MA | 90 | — | 20 hrs | 0.454 | 0.320 | −0.130 |
| Ex13 | 4V 20MA | 720 | — | 16 hrs | 0.694 | 0.234 | −0.460 |
| Ex7 | 3V 1.2MA | 1641 | — | 38 hrs | 0.949 | 0.716 | −0.233 |

As can be readily observed from a review of the data in Table V the passage for a short time (less than one minute) of a relatively high current (e.g. 10–20 amperes) through the fruit juice has a minimal effect in producing a chemical change in the juice (Runs 1–3) whereas the passage of a low current level (e.g. 1.2 ma–50 ma) through the fruit juice for a protracted period of time e.g. 16–38 hours has a substantially greater effect in producing a chemical change (decrease in absorbance) in the juice.

What is claimed is:

1. A method of treating liquid comestibles having oxygen dissolved or occluded therein to reduce the oxygen content thereof which comprises introducing the liquid containing comestible and an electrolyte solution separately through separate compartments of an electrolytic cell having a first compartment containing an anode and a second compartment containing a cathode, the compartments being separated by a cation permeable membrane, the comestible being introduced into the cathode compartment and the electrolyte solution being introduced into the anode compartment, the electrolyte being a highly dissociatable, non-oxidizable, inorganic acid, applying an electric current between the anode and cathode which flows at a density within the range of about 0.002 to about 10 amperes per square inch, maintaining the comestible in the cathode compartment for a time sufficient to deoxidize and effect removal of the oxygen therefrom but insufficient to effect any substantial chemical change in the comestible and then discharging the deoxidized comestible from the cathode compartment.

2. The process of claim 1 wherein the comestible is a fruit juice.

3. The process of claim 2 wherein the fruit juice is orange juice.

4. The process of claim 1 wherein the cation permeable membrane is formed from sulfonated polytetrafluoroethylene.

5. The process of claim 1 wherein the electrolyte is phosphoric acid.

6. The process of claim 1 wherein the electrolyte is sulfuric acid.

7. The process of claim 1 wherein the comestible is maintained in the cathode compartment for a time period of less than about 10 minutes.

8. The process of claim 7 wherein the comestible is maintained in the cathode compartment for a time period of less than about one minute.

9. The process of claim 1 wherein the current density supplied to the cell is between about 0.01 and about 10 amps/in$^2$.

10. The process of claim 9 wherein the current level supplied to the cell is between about 100 Q/l and about 100,000 Q/l.

11. The process of claim 1 wherein the deoxidized comestible is packaged in containers from which air is substantially absent.

* * * * *